Feb. 6, 1968  G. D. HARRINGTON ET AL  3,367,598
FISHING REEL HAVING IMPROVED BRAKING MEANS
Filed April 26, 1966                              2 Sheets-Sheet 1
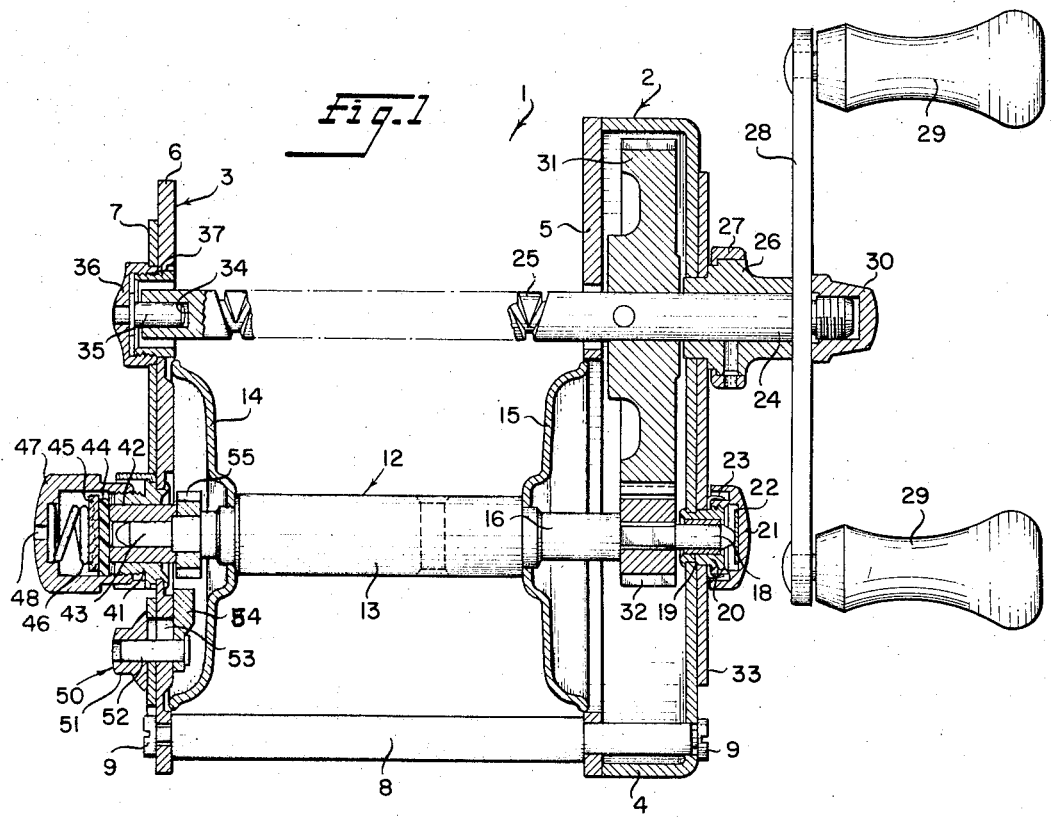
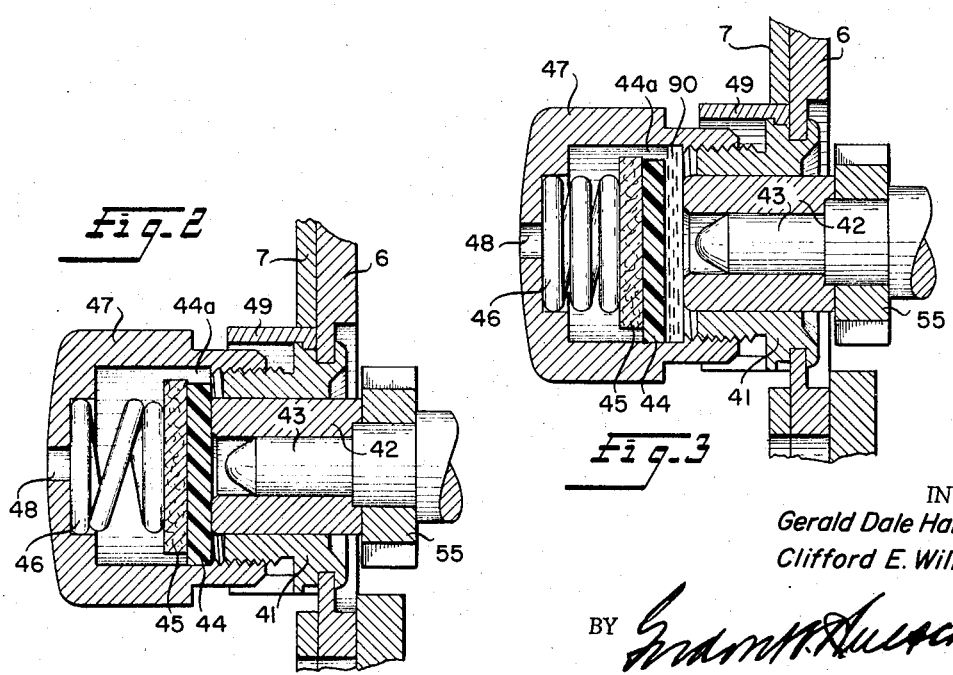
INVENTORS
Gerald Dale Harrington
Clifford E. Willis
BY
ATTORNEY Feb. 6, 1968  G. D. HARRINGTON ET AL  3,367,598
FISHING REEL HAVING IMPROVED BRAKING MEANS
Filed April 26, 1966  2 Sheets-Sheet 2
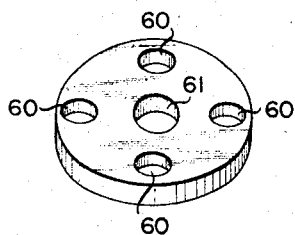
Fig-4
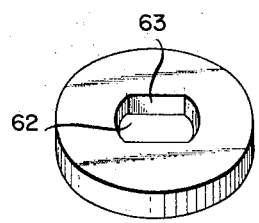
Fig-5
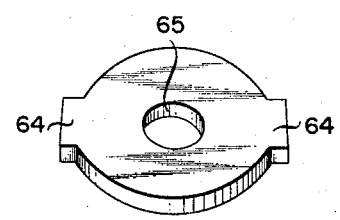
Fig-6
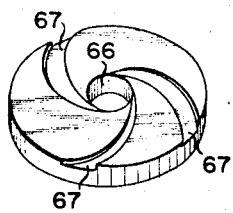
Fig-7
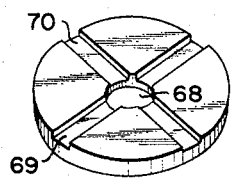
Fig-8
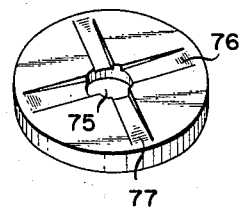
Fig-9
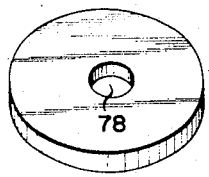
Fig-10
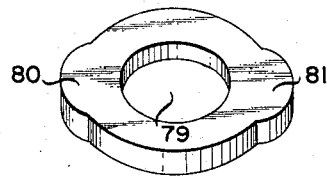
Fig-11
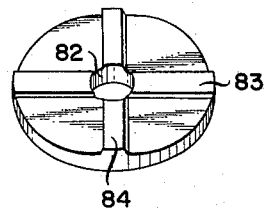
Fig-12
INVENTORS
Gerald Dale Harrington
Clifford E. Willis
BY 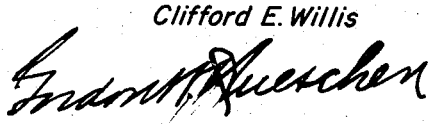
ATTORNEY

United States Patent Office 3,367,598
Patented Feb. 6, 1968

3,367,598
FISHING REEL HAVING IMPROVED
BRAKING MEANS
Gerald Dale Harrington and Clifford E. Willis, Fayetteville, Ark., assignors to Shakespeare Company, Kalamazoo, Mich., a corporation of Michigan
Filed Apr. 26, 1966, Ser. No. 545,482
14 Claims. (Cl. 242—84.52)

The present invention relates to fishing reels of the casting type, and is more particularly concerned with a novel device for providing improved braking at the end of a cast to prevent overrunning of the line spool.

From the inception of the casting reel, attempts have been made to eliminate the problem of back-lash, that is, the state wherein the inertia of the moving parts of the reel causes the spool to continue to rotate after the line has been cast the desired distance and the bait enters the water. As a result of the overrunning of the spool and gear assembly due to such inertia, back-lash occurs causing the line to become badly tangled. Numerous devices have been proposed for eliminating the back-lash problem, some of which have met with moderate success. However, invariably such success has been attained only to the detriment of other properties of the reel, and generally by considerably reducing the length of the cast as a result of the constant drag provided on the moving parts and the line during the casting operation.

It is accordingly an object of the present invention to provide a novel braking means for a fishing reel, particularly of the casting type, which eliminates overrunning and thus prevents back-lash and tangling of the line. It is a further object to provide a braking means of the type described which does not materially place a drag on the line during the major portion of the cast when the line is payed out at a high rate, thus permitting longer but controlled casts to be made. It is a further object to provide a device of the type described which is relatively simple and not exceedingly expensive to manufacture. The accomplishment of the foregoing and additional objects will become more fully apparent hereinafter.

According to the invention, a braking surface is provided at one end of the line spool shaft which rotates with the line spool. A stationary braking surface is provided which engages the rotatable braking surface of the shaft. One of the stationary braking surfaces is formed of a particular type of plastic material. An oil film is provided between the stationary braking surface and the rotatable braking surface. Means is provided for adjustably spring-biasing the stationary surface against the rotating surface. When the biasing force is properly adjusted, a frictional braking force is applied to the rotating spool at low speeds. When the speed of rotation increases, as during a cast, a complete oil interface is established, separating the two braking surfaces and thus greatly reducing the braking force. As the speed of rotation of the spool decreases at the end of a cast, the oil film is broken and a greatly increased braking force is once again applied to the rotating spool, slowing it down sufficiently to prevent overrunning.

The invention in its preferred embodiment is illustrated by the accompanying drawings in which:

FIG. 1 is a longitudinal section of a casting reel having a braking device according to the invention.

FIG. 2 is a fragmentary cross-sectional view of the braking assembly in braking position.

FIG. 3 is a fragmentary cross-sectional view of the braking assembly in free running position.

FIGS. 4–12 are perspective views of various embodiments of the braking disc of the invention.

Reference is now made to the accompanying drawings for a better understanding of the invention, wherein all the parts are numbered and wherein the same numbers are used to refer to corresponding parts throughout.

Referring to FIGS. 1–3, a casting reel is shown which is conventional in most respects and comprises a frame assembly 1 including a drive housing 2 and a brake housing 3. The drive housing 2 is comprised of a head cap 4 and a head plate 5. The brake housing 3 comprises a tail plate 6 and a design panel 7 in engagement therewith. The drive housing 2 and brake housing 3 are affixed together in spaced-apart relationship by means of pillars 8, only one of which is shown in the drawing. The drive housing and brake housing are affixed to the pillars 8 by means of screws 9.

A line spool 12 having a central cylindrical portion 13 and flanges 14 and 15 affixed to a shaft 16 is suitably mounted between the drive housing and brake housing. The bearing end 18 of the shaft 16 is journaled in a sleeve bearing 19 retained in a bearing housing 20. A cap 21 is retained on the bearing housing 20 by means of complementary screw threads. A thrust bearing 22 retained within the cap engages the end of the shaft 18. A spring detent 23 restrains rotational movement of the cap 21.

A gear stem 24 terminating in a double helically grooved carriage screw 25 is journaled in a gear stem bearing 26, having an oil ring 27 mounted thereon. A double crank 28 having handles 29 is affixed to the gear stem 24 by means of a nut 30 threaded thereon. A drive gear 31 affixed to the gear stem 24 engages a pinion gear 32 affixed to the shaft end 18. A design plate 33 is suitably affixed to the outside surface of the head cap 4. The end of the carriage screw 25 is provided with an axial bearing bore 34. A needle bearing 35 affixed to a bearing cap 36 is journaled in the bore 34. The cap 36 is threadedly mounted on a bushing 37 which is affixed to the tailplate 6.

The brake assembly of the invention comprises a bushing 41 mounted in the tailplate 6 supporting a sleeve bearing or collar 42 journaled therein and frictionally affixed to the other reduced end 43 of the spool shaft 16. A brake disc 44 prepared from a material such as Teflon (polytetrafluoroethylene) defines a fixed braking surface which engages a rotatable braking surface defined by the end of the sleeve bearing 42. Behind the brake disc 44 is a felt disc 45 spring-biased against the brake disc 44 by a spring 46 retained within a cap 47 threadedly engaging the bushing 41. The force exerted by the brake disc 44 against the end of the sleeve bearing 42 may be adjusted by rotating the cap 47. An opening 48 is provided in the cap to permit oil to be injected therein. The felt disc serves as an oil reservoir and replenishes the oil film between the disc 44 and the bearing 42. If desired, either a central or peripheral opening may be provided in the felt disc 45 and the brake disc 44 to facilitate the flow of oil to the braking surfaces. In the embodiment shown, a peripheral notch 44a is so provided. A click panel 49 restrains the cap 47 rotationally.

A conventional click mechanism 50 is provided having a button 51 and a shaft 52 mounted in a slot 53. A leaf spring 54 has one end mounted through an opening in the shaft 52 and engages a cog wheel 55 when placed in position at the upper end of the slot 53.

The remaining structure of the reel is conventional and will not be further described.

FIGS. 4–12 illustrate various forms in which the brake disc 44 may be provided. FIG. 4 illustrates a disc having peripheral openings 60 which may be suitably engaged by complimentary structure to prevent rotation of the disc. A central opening 61 is provided to permit oil to be transferred to the braking surfaces.

FIG. 5 illustrates a disc having a central opening 62 with flat opposite sides 63 adapted to engage a flattened shaft. The opening may also provide means for transfer of oil.

The disc shown in FIG. 6 is provided with ears 64 for engaging a groove which may be provided in the cap 47 to prevent rotation of the disc. The disc additionally has a central opening to provide for oil transfer to the braking surfaces.

The disc of FIG. 7 is provided with a central opening 66 for transferring oil, as well as fanned grooves 67 for distributing the oil uniformly over the braking surface of the disc.

The disc shown in FIG. 8 is provided with a central opening 68 and crossed grooves 69 and 70 having a rectangular cross-section.

The disc shown in FIG. 9 is provided with a central opening and crossed grooves 76 and 77 inclined from the center of the disc to the periphery.

The disc of FIG. 10 is provided solely with a small central opening 78, rotation being prevented by frictional engagement with the spring 46.

The disc of FIG. 11 has an enlarged central opening 79 and arcuate ears 80 and 81 designed to engage an arcuate groove.

The disc shown in FIG. 12 is provided with a central opening 82 and one surface recessed to provide cross-ribs 83 and 84. In this structure the ribs provide the braking surface and the recessed area provides means for distributing the oil over the braking surface.

In the embodiment shown and described, the braking surfaces are substantially planar and transverse of the axis of rotation of the reel. Alternatively the braking surfaces may be conical or spherical or have other non-planar surfaces symmetrical about the axis of rotation. Either braking surface may be convex, with the other one having a complementary contour. When the braking surfaces are substantially planar, contours such as shown in the discs of FIGS. 4–12 may alternatively be provided in the rotatable braking surface, in which case the stationary braking surface preferably takes the form of a smooth plane. Although as illustrated in the drawings the rotatable braking surface is provided by the end or edge of a sleeve, which edge is transverse to the axis of rotation of the sleeve, a rotatable braking surface may alternatively be provided by a disc affixed to the shaft 43 by any suitable means. Such disc may have the surface contours previously mentioned, if desired.

In operation, the cap 47 is adjusted to provide the proper force biasing the brake disc 44 against the end of the rotating sleeve bearing 42. The braking surface of the end of the bearing breaks through the surface of oil and makes direct contact with the disc, providing a large braking force. This condition of the braking assembly is illustrated in FIG. 2. As the cast is made, the spool picks up speed, the bushing initially sloshing oil about and providing reduced but still appreciable braking force. As the spool rotation reaches a high velocity as line is being payed out, the brake disc 44 is forced back against the spring 46. The surface of the disc 44 is now separated from the braking surface of the sleeve bearing by a film of oil 90, greatly reducing the amount of braking force applied. This condition is illustrated in FIG. 3. At the end of the cast as the bait hits the water and the spool starts to slow down, oil sloshing recurs and the braking force increases. This reduces the speed of rotation, thus preventing overrunning of the reel. As the speed of rotation is reduced further, the bushing again makes contact with the disc through the oil film and provides an even greater braking force, bringing the rotation of the spool to a stop.

The fishing reel of the invention has a number of advantages over prior art reels. The reel is provided with a novel braking structure which automatically adjusts the braking force during casting, providing only a small braking force during the major portion of the cast, and increasing the force at the end of the cast to prevent overrunning of the line spool. It has a major advantage in that, although controllable braking force is provided at the end of a cast to prevent overrunning, the braking force is substantially reduced during the major portion of the cast so that longer casts can be made with less effort than with prior art devices where a uniform braking force is applied throughout the cast. The braking structure is foolproof, readily and inexpensively constructed, and may be adjusted with precision for various types of casting.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:

1. In a fishing reel comprising a frame structure, a line spool rotatably mounted within said frame structure, and manually operable drive means operatively connected to one end of said spool for driving said spool, the improvement which comprises a braking assembly operatively connected at an end of said spool, said braking assembly comprising:
   (1) means providing a rotatable braking surface operatively connected to the end of sid spool,
   (2) means providing a braking surface rotatably fixed with respect to said frame structure and normally engaging said rotatable braking surface,
   (3) means providing a force spring-biasing said fixed braking surface against said rotatable braking surface, and,
   (4) means providing a film of oil between said rotatable and said fixed braking surfaces, whereby when said spool is rotated at a sufficient velocity, said rotatable braking surface rides on a film of oil and the braking force between said rotatable and said fixed braking surfaces reaches a minimum, and whereby when the rotational velocity of said spool is reduced, said film of oil is penetrated and the braking force between said surface is increased.

2. In a fishing reel according to claim 1, the improvement wherein said means providing a braking surface (2) comprises a disc.

3. In a fishing reel according to claim 2, the improvement wherein said disc is comprised of a plastic material.

4. In a fishing reel according to claim 3, the improvement wherein said plastic material is Teflon.

5. In a fishing reel according to claim 1, the improvement wherein said means (3) providing a force spring-biasing said fixed braking surface against said rotatable braking surface comprises a helical compression spring.

6. In a fishing reel according to claim 5, the improvement wherein said compression spring is provided in a housing affixed to said frame structure by means of complementary screw threads, whereby said spring may be adjustably compressed by rotating said housing.

7. In a fishing reel according to claim 1, the improvement wherein said means (4) providing a film of oil comprises an oil-absorbent disc.

8. In a fishing reel according to claim 7, the improvement wherein said disc is comprised of felt.

9. In a fishing reel according to claim 2, the improvement wherein said disc is provided with an axial opening permitting oil to pass therethrough.

10. In a fishing reel according to claim 2, the improvement wherein said disc is provided with an axial opening and radial grooves adapted to distribute oil over the braking surface of said disc.

11. In a fishing reel according to claim 2, the improvement wherein the braking surface of said disc comprises a plurality of radial ribs.

12. In a fishing reel according to claim 1, the improvement wherein said means (1) providing a rotatable braking surface comprises a cylindrical body operatively affixed to one end of said spool and having a transverse surface engaging said means (2) providing a fixed braking surface.

13. In a fishing reel according to claim 1, the improvement wherein said means (1) providing a rotatable braking surface comprises a tubular sleeve affixed to said spool and having an end providing a transverse surface in engagement with said means (2) providing a fixed braking surface.

14. In a fishing reel according to claim 1, the improvement wherein said means (1) comprising a rotatable braking surface comprises a disc operatively affixed to said spool and having a surface engaging said means (2) providing a fixed braking surface.

References Cited

UNITED STATES PATENTS

| 2,482,428 | 9/1949 | Miller | 188—187 XR |
| 2,607,448 | 8/1952 | Hollander | 242—84.52 |
| 2,821,269 | 1/1958 | Keil | 188—187 XR |

FOREIGN PATENTS

| 683,520 | 11/1952 | Great Britain. |

BILLY S. TAYLOR, *Primary Examiner.*